No. 672,094.  
G. CLIFFTON.  
FEED COOKER.  
(Application filed Aug. 27, 1900.)  
Patented Apr. 16, 1901.
(No Model.)
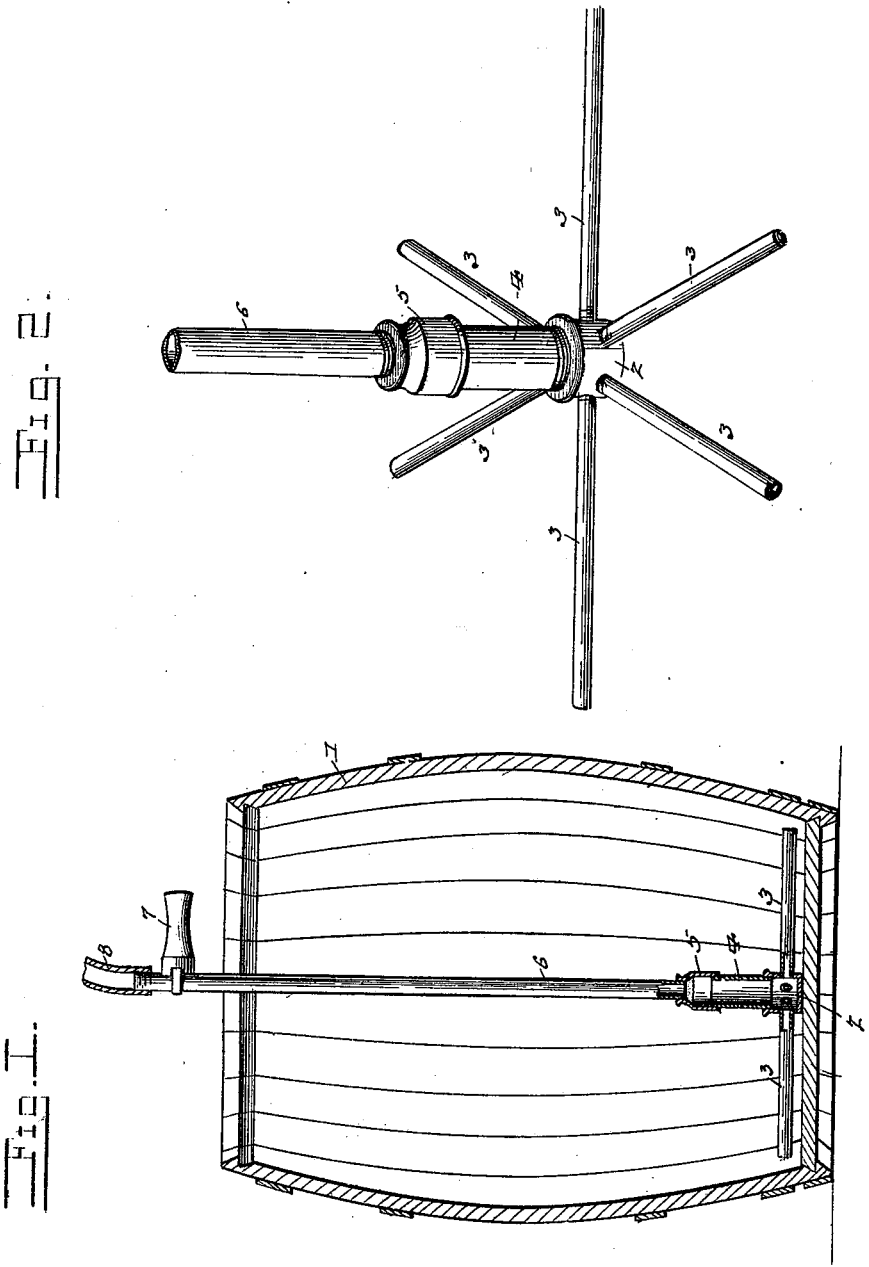

UNITED STATES PATENT OFFICE.

GEORGE CLIFFTON, OF WEST UNITY, OHIO.

FEED-COOKER.

SPECIFICATION forming part of Letters Patent No. 672,094, dated April 16, 1901.

Application filed August 27, 1900. Serial No. 28,198. (No model.)

*To all whom it may concern:*

Be it known that I, GEORGE CLIFFTON, a citizen of the United States, residing at West Unity, in the county of Williams and State of Ohio, have invented a new and useful Feed-Cooker, of which the following is a specification.

This invention relates to feed-cookers, and has for its object to provide improved means for conveying steam to the contents of a feed-containing receptacle and for effectively distributing the steam throughout the feed, so as to thoroughly agitate and cook the latter. It is furthermore designed to arrange the device so as to be vertically reciprocated within the feed-receptacle, so as to conveniently mix the feed and water, and also to provide such a device which is complete in itself and is applicable to any ordinary barrel or other receptacle which may be used for containing the feed.

With these and other objects in view the present invention consists in the combination and arrangement of parts, as will be hereinafter more fully described, shown in the accompanying drawings, and particularly pointed out in the appended claim, it being understood that changes in the form, proportion, size, and minor details may be made within the scope of the claim without departing from the spirit or sacrificing any of the advantages of the invention.

In the drawings, Figure 1 is a vertical central sectional view of a feed-cooker constructed in accordance with the present invention. Fig. 2 is a detail perspective view of the steam-distributing device.

Corresponding parts are designated by like characters of reference in both figures of the drawings.

Referring to the drawings, 1 designates an ordinary barrel or other receptacle used for containing and cooking stock-feed, the latter being commonly cooked by introducing steam into the barrel.

In carrying out the present invention to supply steam to the interior of the barrel I provide a distributer in the form of a cup-shaped cap 2, from which radiate a plurality of pipes 3, which have open outer ends. The upper open end of the distributer is internally screw-threaded, and fitted thereto is a tubular nipple 4, which has a reducer or coupling 5 at its upper end for connection with a metal pipe 6, through which the steam is conveyed to the distributer. A laterally-disposed handle 7 is connected adjacent to the upper end of the pipe, and a flexible tube or pipe 8 is connected to the upper end of the pipe 6 and has its opposite end connected to a source of steam. (Not shown.) The upper end of the pipe 6 preferably extends above the receptacle, and the handle is also located above the receptacle.

In the operation of the device the water is poured into the receptacle and afterward the chopped feed. The steam-distributer is then lowered into the receptacle and reciprocated vertically or in an endwise direction therein by means of the handle, so as to thoroughly mix the water and feed. After this operation the distributer is rested upon the bottom of the receptacle, and the steam is turned on and conveyed through the flexible tube, the pipe 6, and the radial distributer-pipes 3, from the outer ends of which the steam is exhausted in an outward direction against the sides of the receptacle, thereby causing currents in the feed to thoroughly agitate and cook the same. To further agitate the feed, the device may be reciprocated while the steam is being supplied to the receptacle.

From the foregoing description it will be apparent that the present device is complete in itself and may be applied to any common or ordinary form of feed-cooking receptacle.

The purpose of having the cup-shaped cap removably connected to the pipe-shank is to facilitate the cleansing of the radial tubes should they become clogged by the feed.

What is claimed is—

A feed-agitator and steam-distributer for feed-cookers, comprising a rigid pipe, which is open at opposite ends and forms the shank of the device, a flexible tube connected to one open end of the pipe, a cup-shaped cap removably connected to the opposite end of the pipe-shank, radial discharge-tubes carried by the cap and having their outer ends open, and a handle carried by the pipe-shank and located adjacent to the flexible tube.

In testimony that I claim the foregoing as my own I have hereto affixed my signature in the presence of two witnesses.

GEORGE CLIFFTON.

Witnesses:
ARMA GRASS,
ROBERT P. HAYS.